(12) United States Patent
Ortiz Hernandez

(10) Patent No.: US 12,716,441 B2
(45) Date of Patent: Aug. 25, 2026

(54) WIRE HARNESS BLOCK CLAMP

(71) Applicant: RTX Corporation, Farmington, CT (US)

(72) Inventor: Eric X. Ortiz Hernandez, Isabela, PR (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/888,841

(22) Filed: Sep. 18, 2024

(65) Prior Publication Data

US 2026/0078786 A1 Mar. 19, 2026

(51) Int. Cl.

| | |
|---|---|
| ***H02G 3/22*** | (2006.01) |
| ***F02C 7/00*** | (2006.01) |
| ***F16B 7/04*** | (2006.01) |
| *H01B 7/00* | (2006.01) |

(52) U.S. Cl.

CPC .............. *F16B 7/0433* (2013.01); *F02C 7/00* (2013.01); *H01B 7/0045* (2013.01)

(58) Field of Classification Search

CPC .. H02G 3/22; H02G 3/30; H02G 3/32; H02G 3/34; H02G 3/36; H02G 15/00; H02G 15/007; H02G 15/064

See application file for complete search history.

(56) References Cited

U.S. PATENT DOCUMENTS

| | | | | |
|---|---|---|---|---|
| 7,467,767 | B2 * | 12/2008 | Miles | F16L 3/1008 248/62 |
| 10,668,874 | B1 | 6/2020 | Troughton et al. | |
| 2006/0219424 | A1 | 10/2006 | Hamazu et al. | |
| 2014/0069691 | A1 | 3/2014 | Cox et al. | |
| 2017/0261153 | A1 | 9/2017 | Kozan et al. | |
| 2022/0149563 | A1 | 5/2022 | Cottin et al. | |

FOREIGN PATENT DOCUMENTS

| | | | |
|---|---|---|---|
| EP | 3712446 | A1 | 9/2020 |
| JP | 2013029031 | A | 2/2013 |

OTHER PUBLICATIONS

European Search Report for EP Application No. 25203202.4 dated Feb. 10, 2026.

* cited by examiner

*Primary Examiner* — Devon C Kramer
*Assistant Examiner* — Sean V Meiller
(74) *Attorney, Agent, or Firm* — Carlson, Gaskey & Olds, P.C.

(57) ABSTRACT

A mechanical system includes a plurality of wire harnesses each have a generally cylindrical outer periphery, and a protective outer coating around at least one electrical wire. A clamp includes at least two clamp halves to form a cylindrical space for receiving and supporting each of the plurality of wire harnesses. The clamp has grommets associated with each of the at least two clamp halves. The grommets are formed of a non-metallic material. The at least two clamp halves are secured together, and are secured to a static surface. There is an alignment feature to align the at least two clamp halves relative to each other. A gas turbine engine is also disclosed.

7 Claims, 4 Drawing Sheets

112
108
110
132
124
126
118
128
116
120
122
114
132

102
90
92

110
108
129
130
132
104
126
102
128
122
106
124
120
132
100

WIRE HARNESS BLOCK CLAMP

BACKGROUND

This application relates to a wire harness clamp that provides more reliability and better protection for the wire harness than existing clamps.

Wire harnesses are used in any number of applications. Typically, a plurality of cables are routed to various locations on a mechanical system. As an example, gas turbine engines include a number of wire harnesses. The wire harnesses may turn while extending from an origination point to a destination point. Typically some structure is utilized to hold the wire harness at a desired location.

In the prior art, a spring clip is utilized to hold the wire harness. A portion of the spring clip is fixed to static structure and the wire harness is forced into the spring clip. There is a spring force from the spring clip on the wire harness. In the prior art the metal spring clip has sometimes resulted in chaffing of the underlying protective coating surrounding the wire harnesses. In addition, the spring clip are prone to allowing the wire harnesses to move at times.

SUMMARY

In a featured embodiment, a mechanical system includes a plurality of wire harnesses each have a generally cylindrical outer periphery, and a protective outer coating around at least one electrical wire. A clamp includes at least two clamp halves to form a cylindrical space for receiving and supporting each of the plurality of wire harnesses. The clamp has grommets associated with each of the at least two clamp halves. The grommets are formed of a non-metallic material. The at least two clamp halves are secured together, and are secured to a static surface. There is an alignment feature to align the at least two clamp halves relative to each other.

In another embodiment according to the previous embodiment, the alignment feature includes a tongue on a first of the at least two clamp halves and a tongue on a second of the at least two clamp halves, with the tongue received in the groove.

In another embodiment according to any of the previous embodiments, there is an alignment feature at both of two outer ends of each of the first and second block halves.

In another embodiment according to any of the previous embodiments, the alignment feature is only used at one of two outer ends of the at least two clamp halves.

In another embodiment according to any of the previous embodiments, the system is a gas turbine engine.

In another embodiment according to any of the previous embodiments, the at least two clamp halves are formed of a metal.

In another embodiment according to any of the previous embodiments, each of the at least two clamp halves have a stop, to prevent overtightening when the at least two clamp halves are secured together.

In another embodiment according to any of the previous embodiments, the at least two clamp halves are secured together by a bolt.

In another embodiment according to any of the previous embodiments, the grommets have shoulders extending in a direction from each of the grommets toward the other of the grommets and have an opening with the bolt passing through it.

In another embodiment according to any of the previous embodiments, the system is a gas turbine engine.

In another featured embodiment, a gas turbine engine includes a compressor, a turbine and a combustor. A plurality of wire harnesses each have a generally cylindrical outer periphery, and a protective outer coating around at least one electrical wire. A clamp includes at least two clamp halves to form a cylindrical space for receiving and supporting each of the plurality of wire harnesses. The clamp has a plurality of grommets associated with each of the at least two clamp halves. The grommets are formed of a non-metallic material. The at least two clamp halves are secured together, and are secured to a static surface. There is an alignment feature to align the at least two clamp halves relative to each other.

In another embodiment according to any of the previous embodiments, the alignment feature includes a tongue on a first of the at least two clamp halves and a tongue on a second of the at least two clamp halves, with the tongue received in the groove.

In another embodiment according to any of the previous embodiments, there is an alignment feature at both of two outer ends of each of the first and second block halves.

In another embodiment according to any of the previous embodiments, the alignment feature is only used at one of two outer ends of the at least two clamp halves.

In another embodiment according to any of the previous embodiments, the system is a gas turbine engine.

In another embodiment according to any of the previous embodiments, the at least two clamp halves are formed of a metal.

In another embodiment according to any of the previous embodiments, each of the at least two clamp halves have a stop, to prevent overtightening when the at least two clamp halves are secured together.

In another embodiment according to any of the previous embodiments, the at least two clamp halves are secured together by a bolt.

In another embodiment according to any of the previous embodiments, the grommets have shoulders extending in a direction from each of the grommets toward the other of the grommets and have an opening with the bolt passing through it.

In another embodiment according to any of the previous embodiments, the system is a gas turbine engine.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
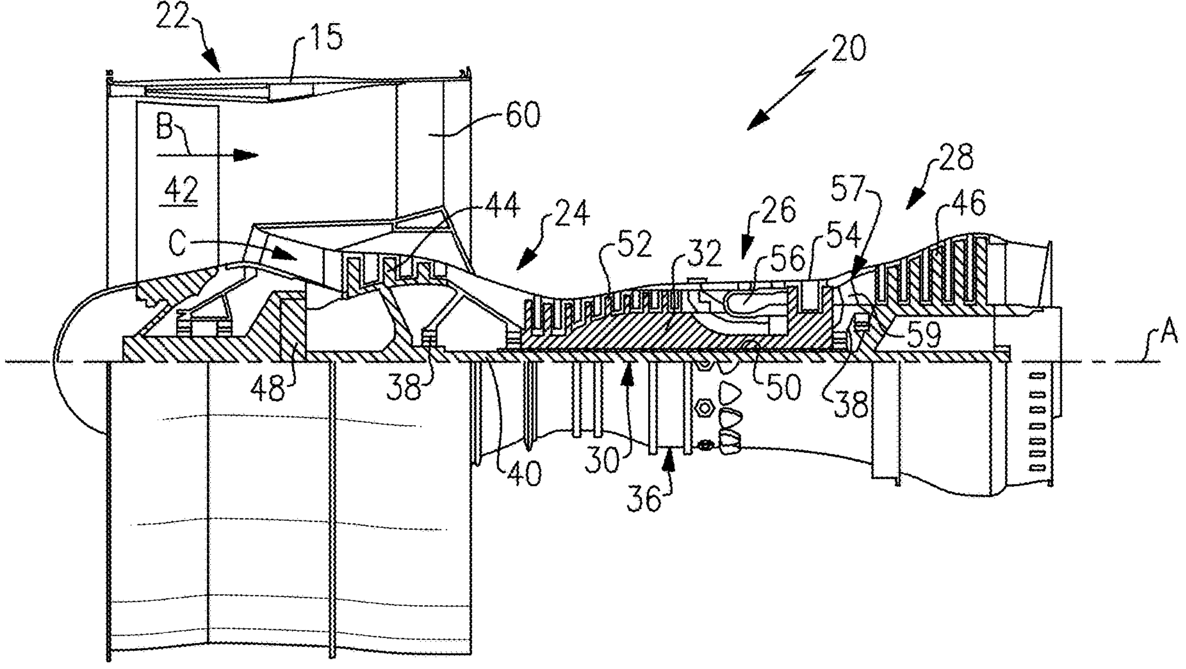
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption-also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram}° \text{R.})/(518.7° \text{R.})]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figures 2A, 2B, 2C:
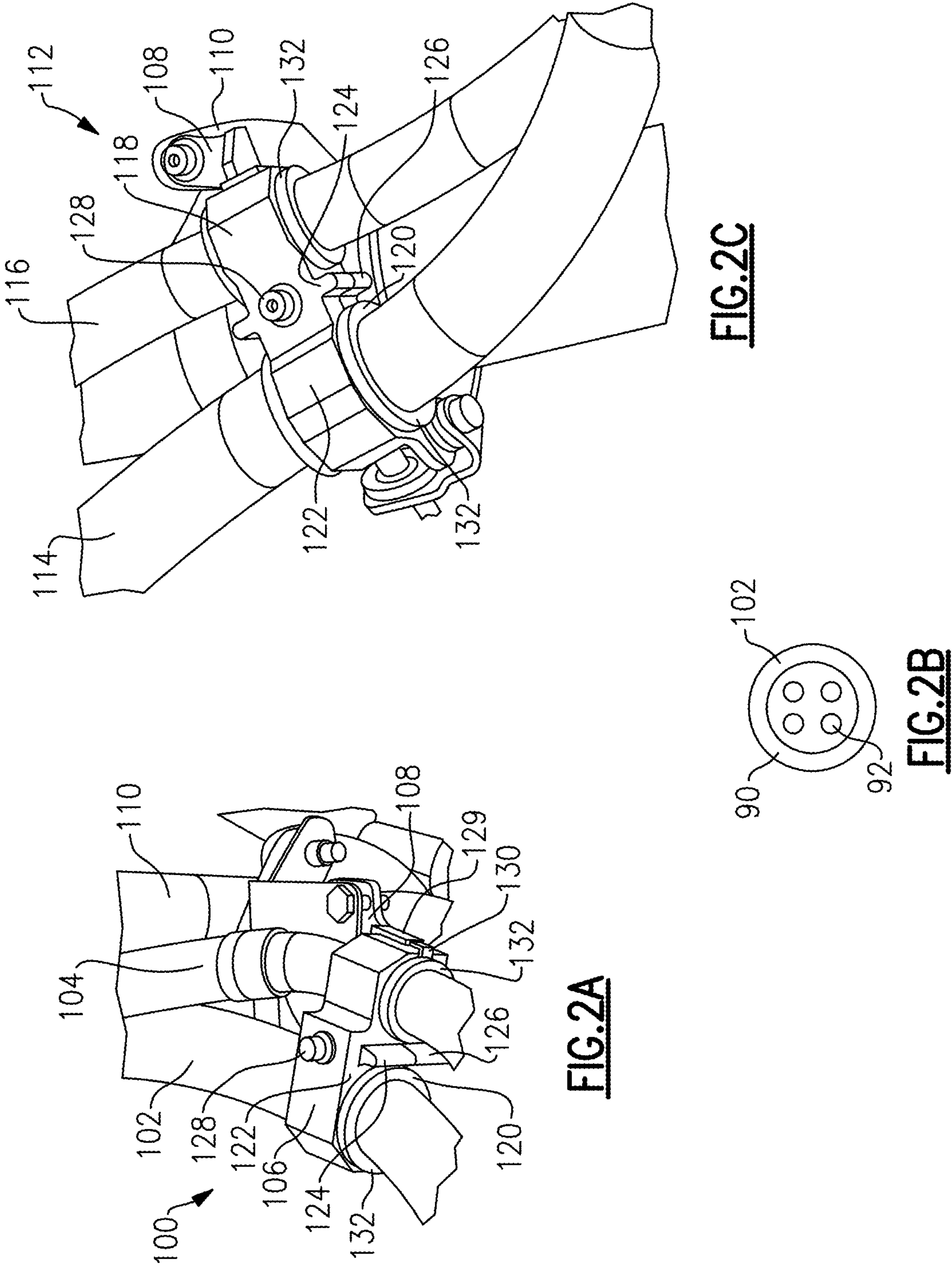
FIG. 2A shows a first example wire harness routing.
FIG. 2B is a cross-section through a wire harness.
FIG. 2C shows another example wire harness routing.

A wire harness assembly 100 is illustrated in FIG. 2A. As shown, two wire harnesses 102 and 104 are being routed between different locations. This may be a part of a gas turbine engine such as the FIG. 1 gas turbine engine.

As shown in FIG. 2B, the wire harness 102 includes outer protective structure 90, typically formed of a plastic or rubber and one or more wires 92 within the outer protective structure 90.

In FIG. 2A a wire harness clamp 106 mounts the wire harnesses 102 and 104. A mount tab 108 is secured to static structure 110, to hold the harness clamp 106 in place.

Another example wire harness location 112 is illustrated in FIG. 2C. Here wire harnesses 114 and 116 are mounted within a harness clamp 118.

As shown, the harness clamps 106 and 118 have two outer clamp halves 120 and 122. Typically, these are machined from metal.

A stop feature 124 and 126 is provided on clamp halves 122 and 120, respectively. A bolt 128 secures the two clamp halves 120 and 122 together. The stop features 124 and 126 prevent overtightening of the bolt 128.

An alignment feature 129/130 ensures the two clamp halves 120 and 122 are properly aligned. As shown, 129 is a tongue like member on half 122 extending into a groove 130 on half 120.

Figure 3:
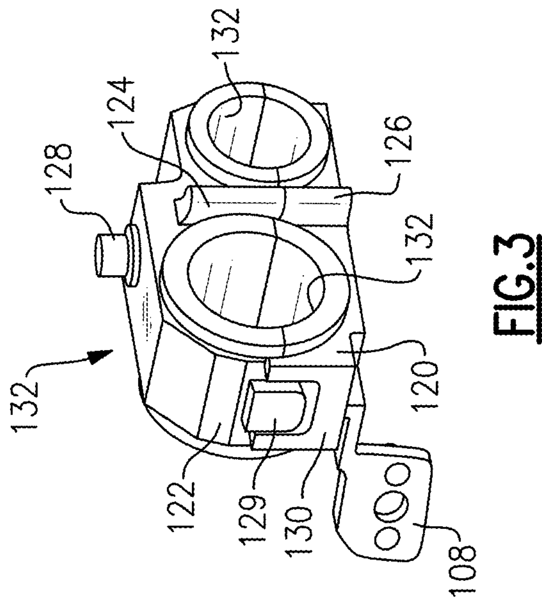
FIG. 3 shows details of a clamp for a wire harness.

As shown in FIG. 3, the block halves 120 and 122 each receive grommets 132 which are typically formed of a rubber or plastic material to protect the structure 90 of the wire harnesses. The grommets 132 are formed of two halves; with one associated with each clamp half 120 and 122.

Figure 4:
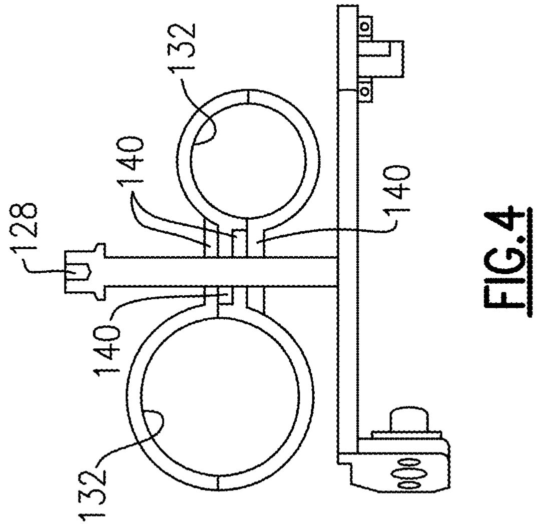
FIG. 4 shows a grommet that is mounted within metal blocks for the clamp.

FIG. 4 shows the grommets 132 with the metal clamp halves 120 and 122 removed. As shown, there are shoulders 140 associated with each half of the grommets 132. These shoulders protect the wire harness structure 90 at an edge gap between the two clamp halves 120 and 122. The shoulders 140 extending in a direction from each of the grommets toward the other of the grommets and have an opening with the bolt passing through it.

Figures 5A, 5B:
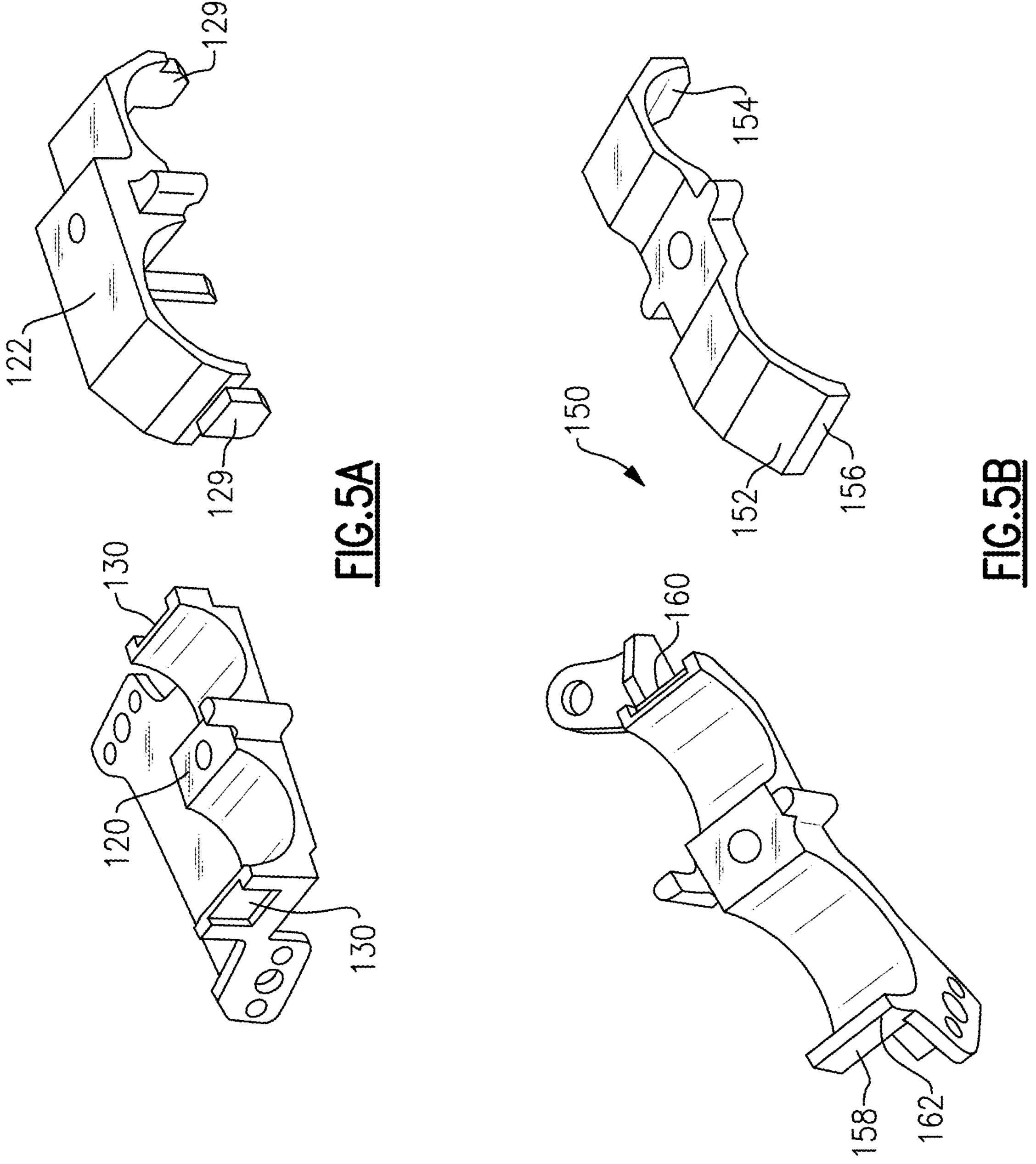
FIG. 5A shows a first type metal block.
FIG. 5B shows another metal block embodiment.

FIG. 5A shows the clamp halves 120 and 122. As can be seen, there are alignment features 129/130 at each end.

FIG. 5B shows an alternative embodiment 150 having clamp halves 152 with a tongue 154 at one end but no tongue at end 156. The second part 158 has a groove 160, but no groove at the opposed end 162. Embodiment 150 may be utilized when there is insufficient space around the end 162.

A mechanical system under this disclosure could be said to include a plurality of wire harnesses each having a generally cylindrical outer periphery, and a protective outer coating around at least one electrical wire. A clamp includes at least two clamp halves to form a cylindrical space for receiving and supporting each of the plurality of wire harnesses. The clamp has grommets associated with each of the at least two clamp halves. The grommets are formed of a non-metallic material. The at least two clamp halves are secured together, and are secured to a static surface. There is an alignment feature to align the at least two clamp halves relative to each other.

A gas turbine engine under this disclosure could be said to include a compressor, a turbine and a combustor. A plurality of wire harnesses each have a generally cylindrical outer periphery, and a protective outer coating around at least one electrical wire. A clamp includes at least two clamp halves to form a cylindrical space for receiving and supporting each of the plurality of wire harnesses. The clamp has a plurality of grommets associated with each of the at least two clamp halves. The grommets are formed of a non-metallic material. The at least two clamp halves are secured together, and are secured to a static surface. There is an alignment feature to align the at least two clamp halves relative to each other.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A mechanical system comprising: a plurality of wire harnesses each having an outer periphery, and a protective outer coating around at least one electrical wire; a clamp including at least two clamp halves to form a cylindrical space for receiving and supporting each of the plurality of wire harnesses, the clamp having grommets associated with each of the at least two clamp halves, the grommets being formed of a non-metallic material, the at least two clamp halves being secured together, and being secured to a static surface, and there being an alignment feature to align the at least two clamp halves relative to each other; and wherein the alignment feature includes a tongue on a first of the at least two clamp halves and a groove on a second of the at least two clamp halves, with the tongue received in the groove; wherein each of the at least two clamp halves have a stop, to prevent overtightening when the at least two clamp halves are secured together; wherein the at least two clamp halves are secured together by a bolt; and wherein the grommets have shoulders extending in a direction from each of the grommets toward the other of the grommets and having an opening with the bolt passing through said shoulder, and the shoulders on the grommets also being formed of a non-metallic material, and at least two of said clamps are positioned adjacent to each other, and being secured to the static surface by a single fastener, with each of the grommets of the at least two clamp halves on each of the at least two clamps having the shoulders extending towards an opposed one of said at least two clamps, such that there are four of said shoulders with the openings all receiving the bolt.

2. The mechanical system as set forth in claim 1, wherein the grommets, including the shoulders, are formed of at least one of a rubber or plastic material.

3. A gas turbine engine comprising: a compressor, a turbine and a combustor; a plurality of wire harnesses each having an outer periphery, and a protective outer coating around at least one electrical wire; a clamp including at least two clamp halves to form a cylindrical space for receiving and supporting each of the plurality of wire harnesses, the clamp having grommets associated with each of the at least two clamp halves, the grommets being formed of a non-metallic material, the at least two clamp halves being secured together, and being secured to a static surface, and there being an alignment feature to align the at least two clamp halves relative to each other; and wherein the alignment feature includes a tongue on a first of the at least two clamp halves and a groove on a second of the at least two clamp halves, with the tongue received in the groove; wherein each of the at least two clamp halves have a stop, to prevent overtightening when the at least two clamp halves are secured together; wherein the at least two clamp halves are secured together by a bolt; and wherein the grommets have shoulders extending in a direction from each of the grommets toward the other of the grommets and having an opening with the bolt passing through said shoulder, and the shoulders on the grommets also being formed of a non-metallic material, and at least two of said clamps are positioned adjacent to each other, and being secured to the static surface by a single fastener, with each of the grommets of the at least two clamp halves on each of the at least two clamps having the shoulders extending towards an opposed one of said at least two clamps, such that there are four of said shoulders with the openings all receiving the bolt.

4. The gas turbine engine as set forth in claim 3, wherein there is an alignment feature at both of two outer ends of each of the first and second clamp halves.

5. The gas turbine engine as set forth in claim 3, wherein the alignment feature is only used at one of two outer ends of the at least two clamp halves.

6. The gas turbine engine as set forth in claim 3, wherein the at least two clamp halves are formed of a metal.

7. The mechanical system as set forth in claim 1, wherein the grommets, including the shoulders, are formed of at least one of a rubber or plastic material.

* * * * *